Feb. 26, 1935.  A. F. BRADLEY  1,992,286
MACHINE FOR MAKING BALE TIES
Filed Aug. 23, 1933   8 Sheets-Sheet 7
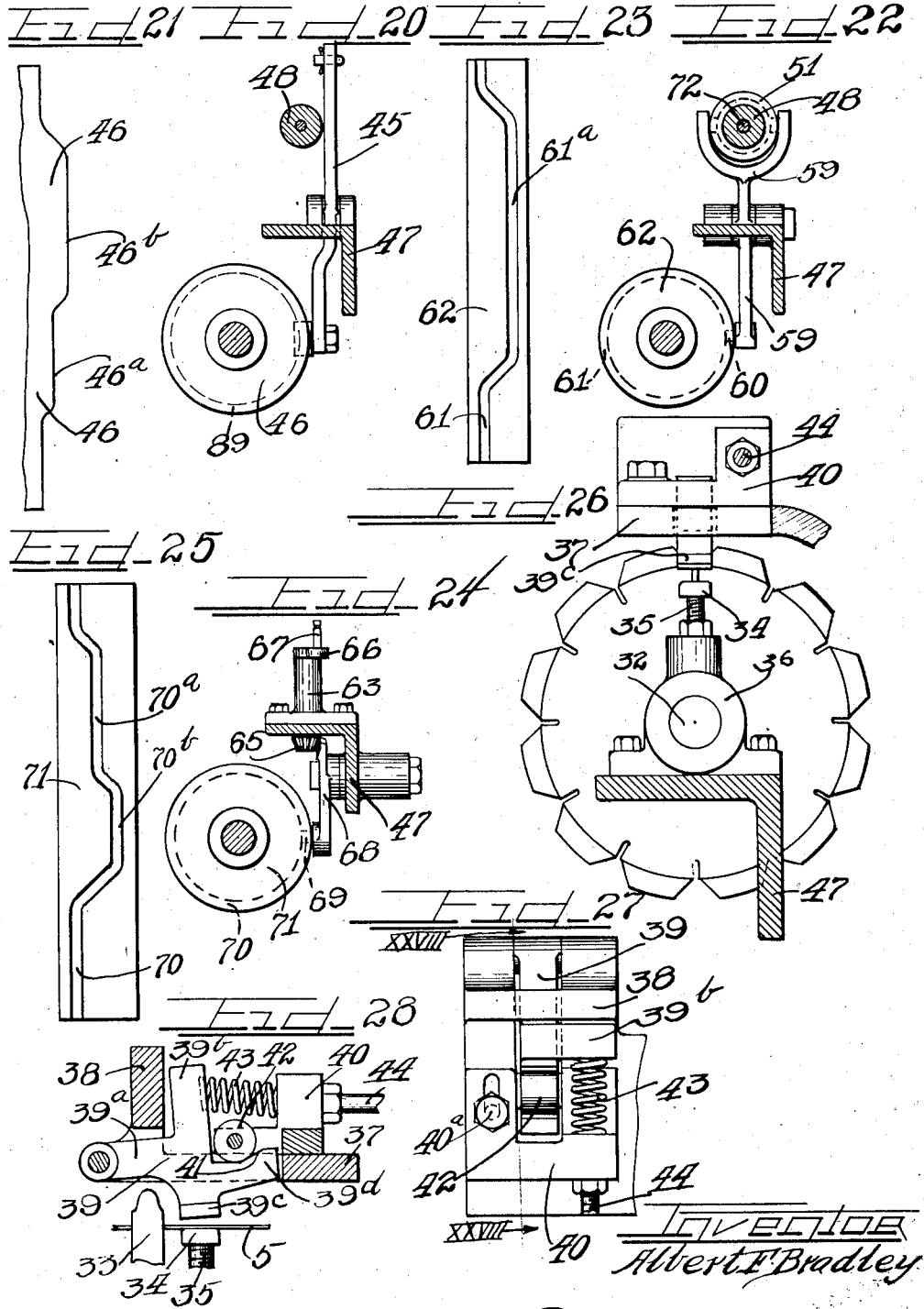

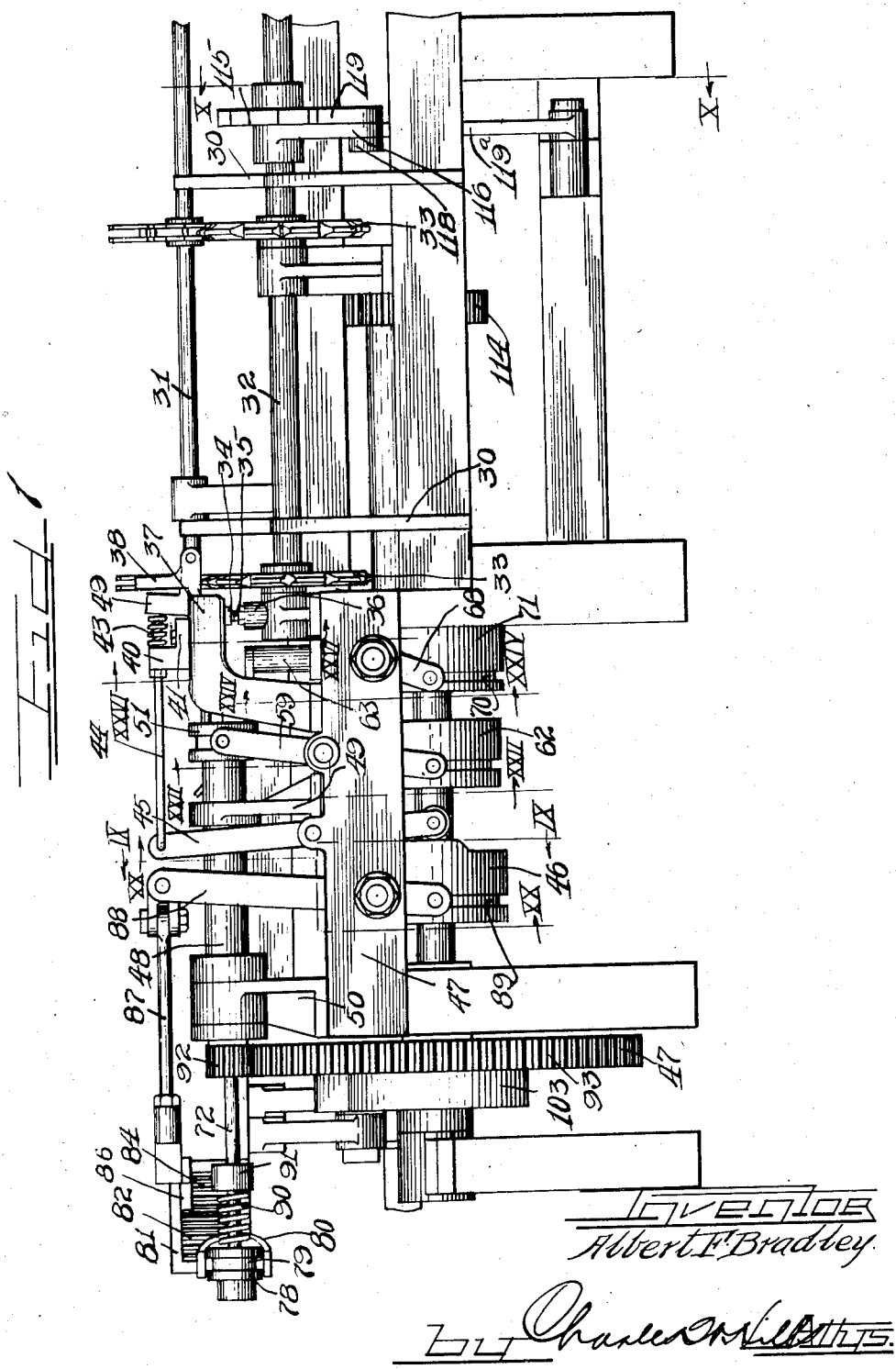

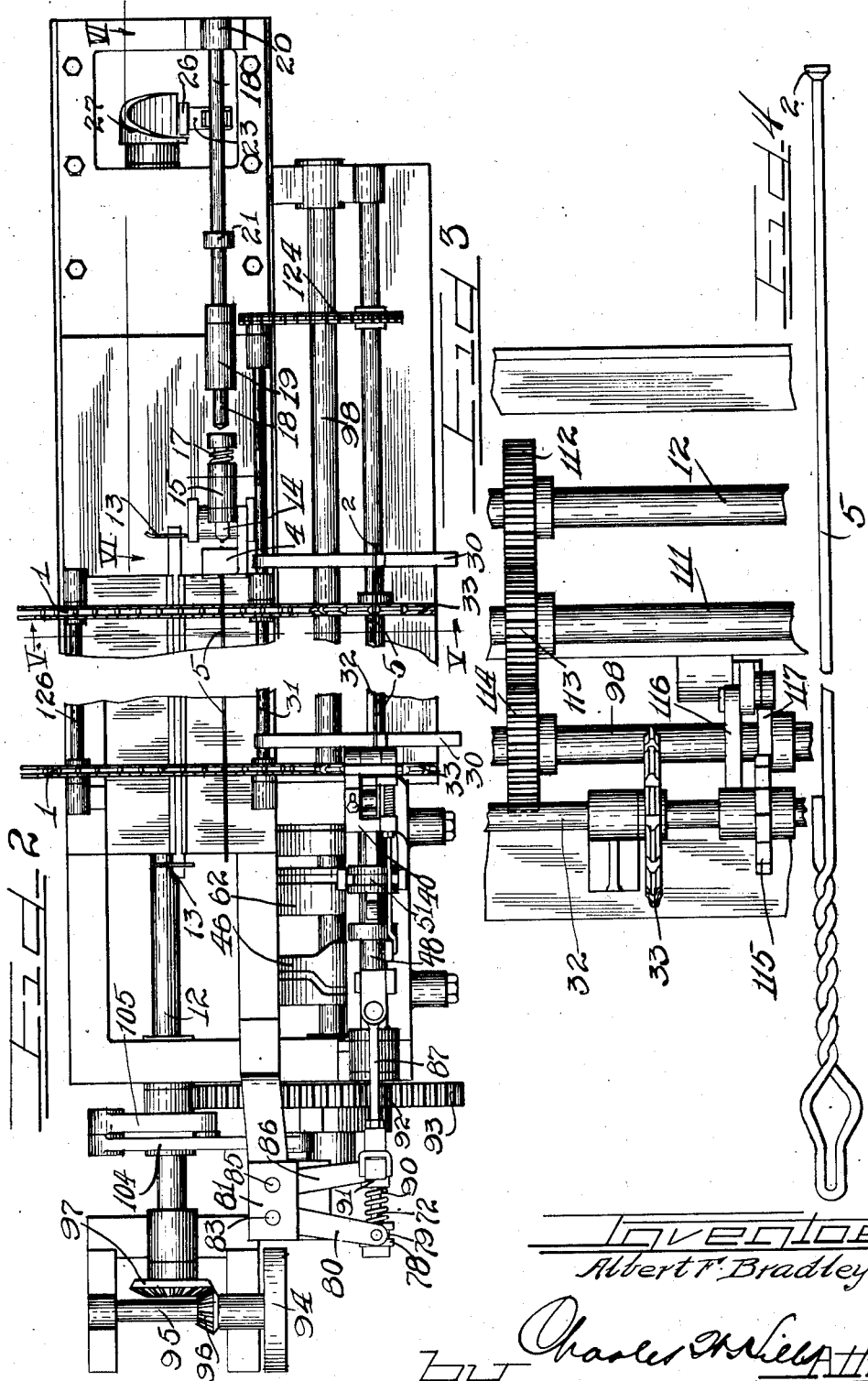

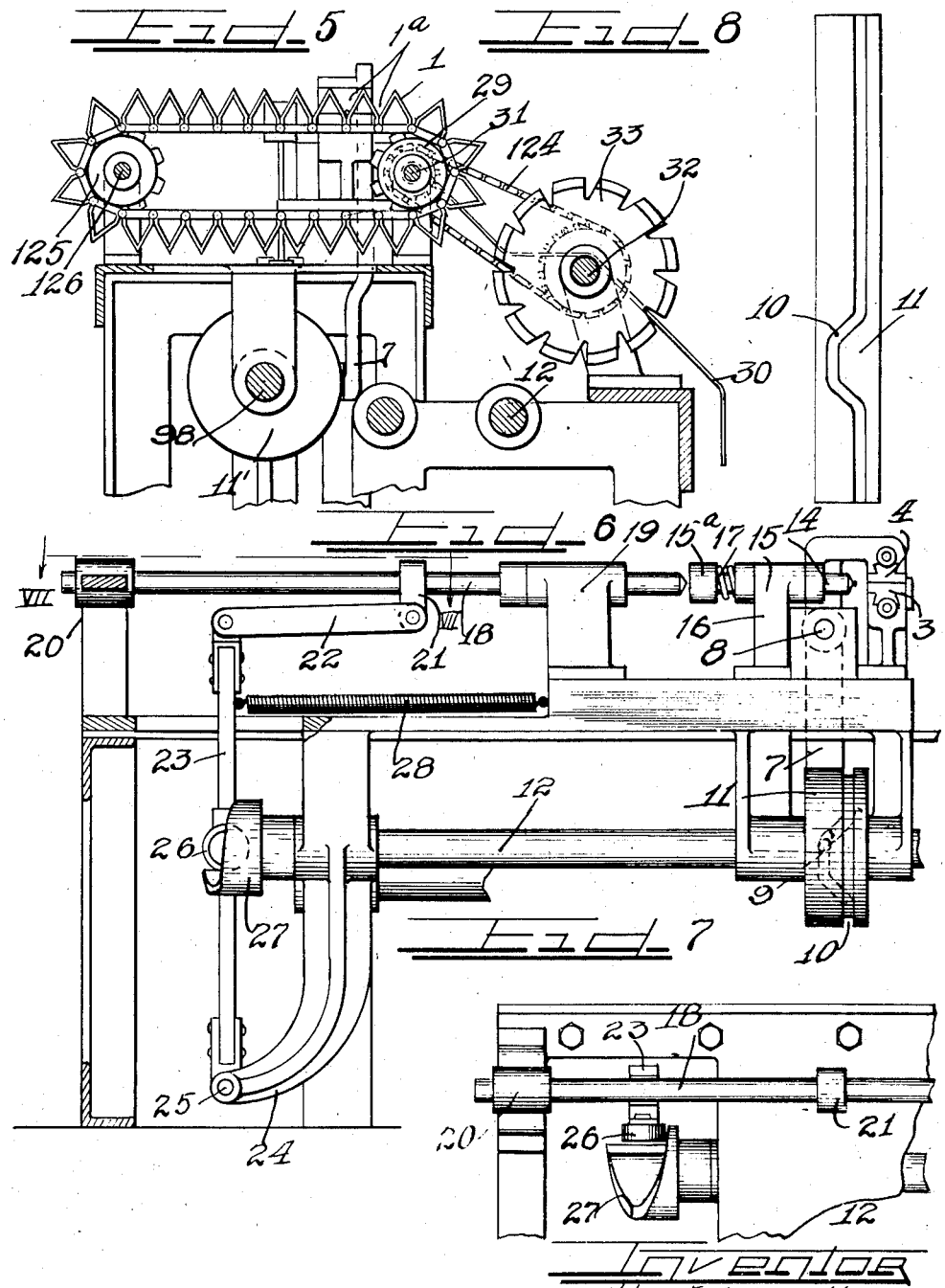

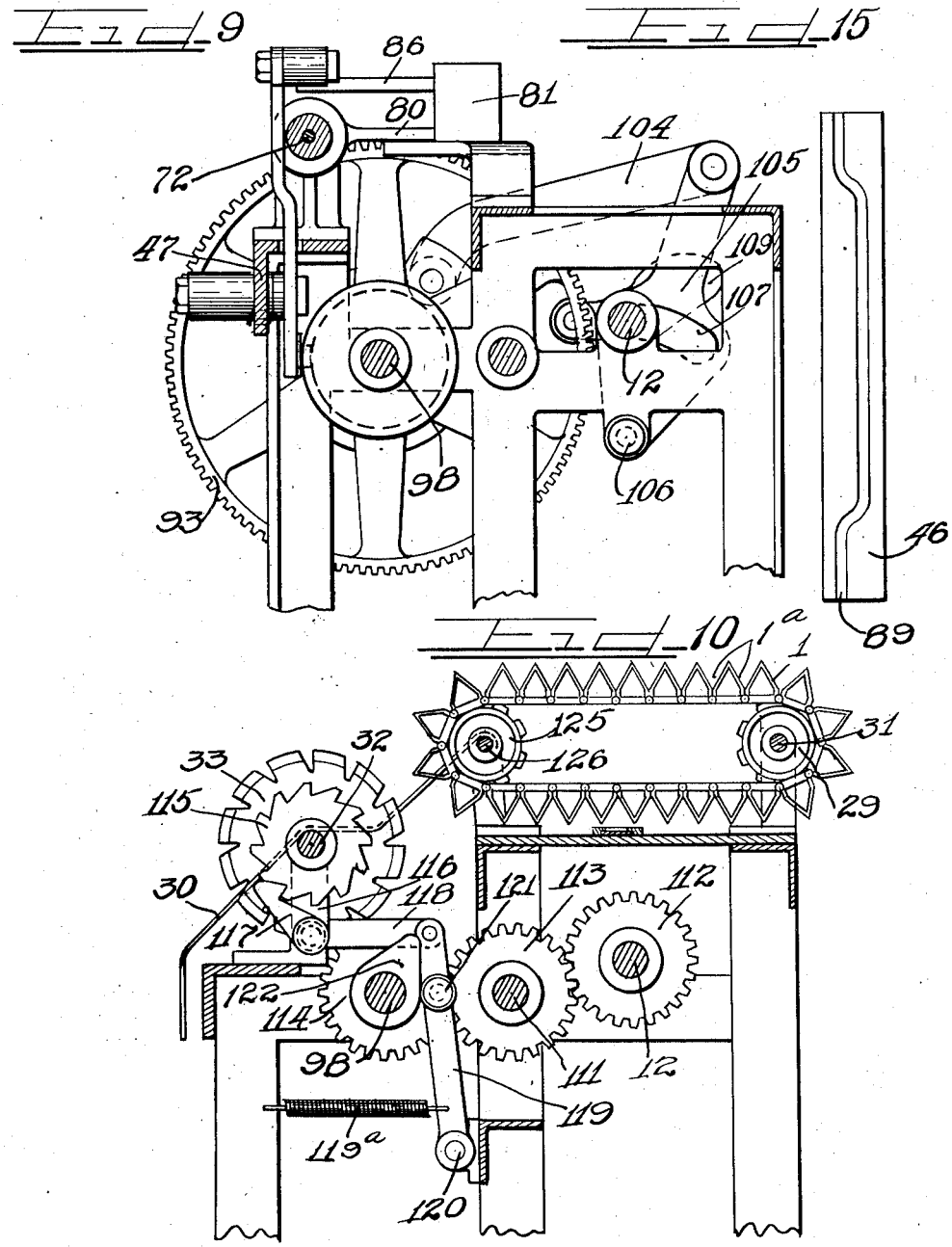

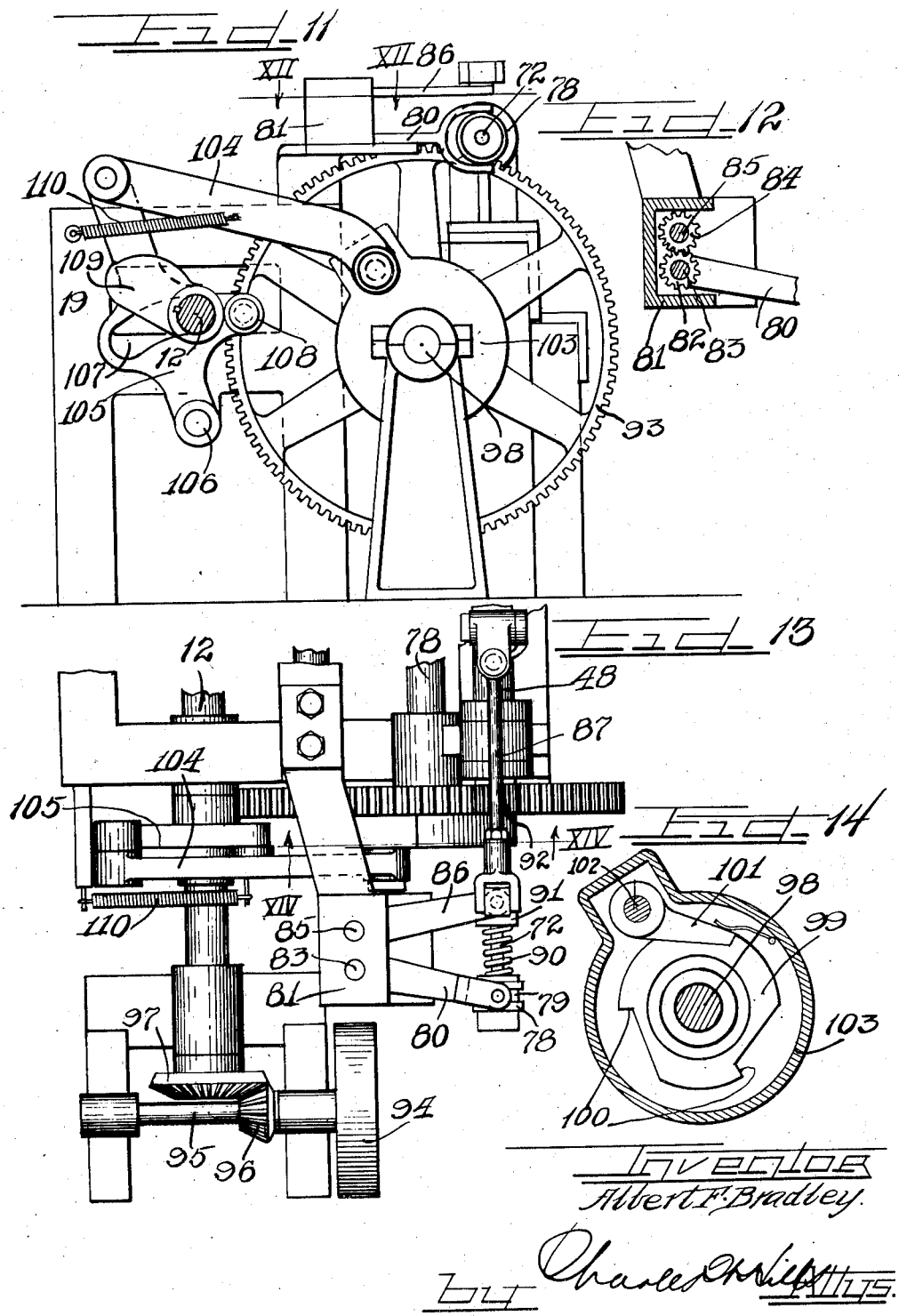

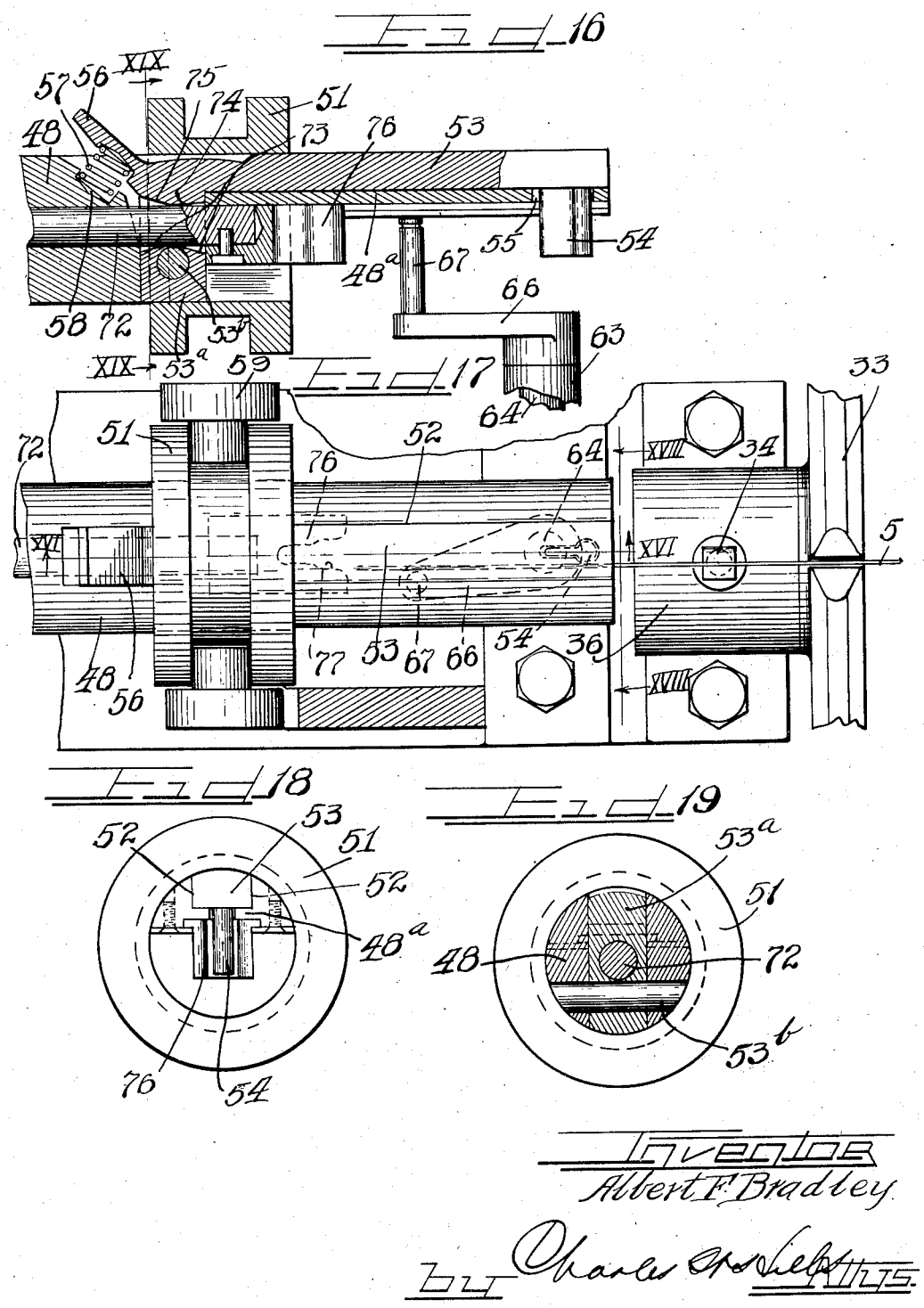

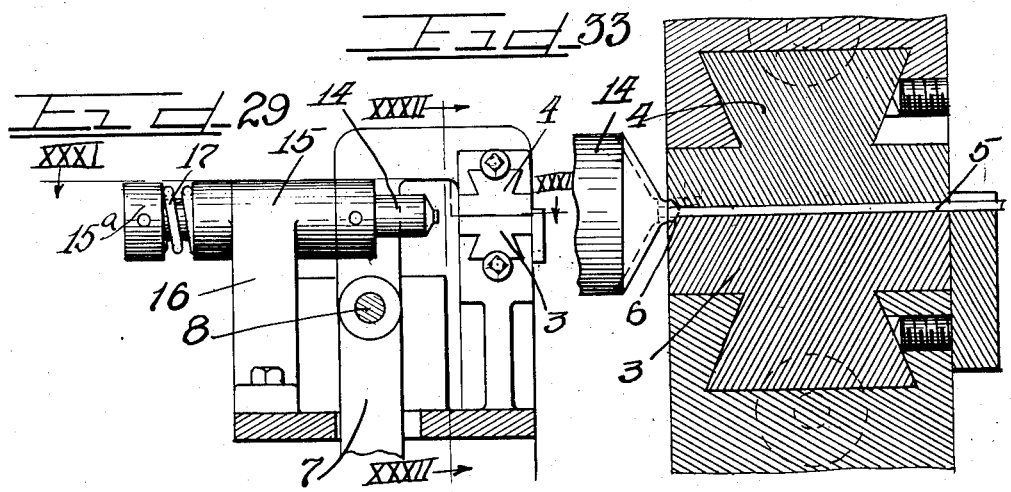
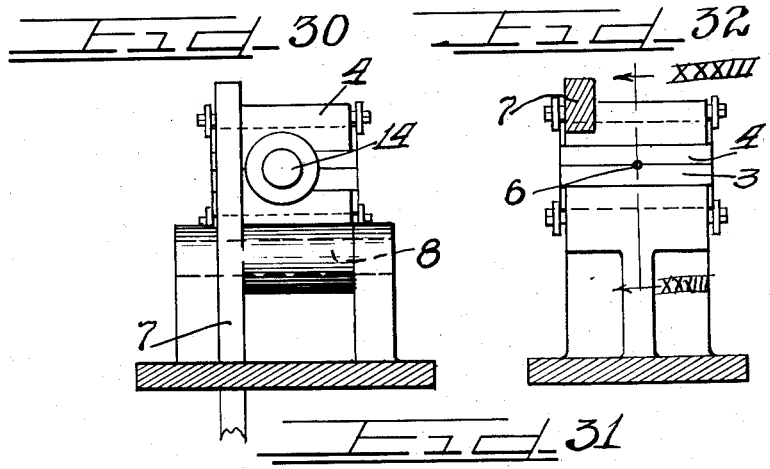
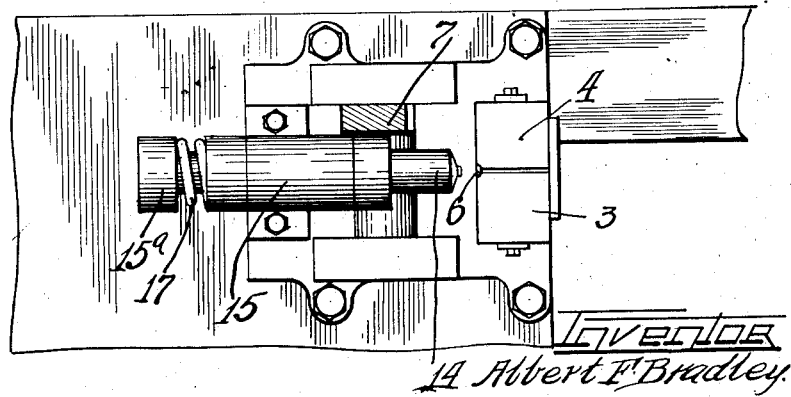

Patented Feb. 26, 1935

1,992,286

UNITED STATES PATENT OFFICE 1,992,286

MACHINE FOR MAKING BALE TIES

Albert F. Bradley, Sterling, Ill., assignor to Northwestern Barb Wire Company, Sterling, Ill., a corporation of Illinois Application August 23, 1933, Serial No. 686,342

20 Claims. (Cl. 140—73)

This invention relates to a machine for making bale ties and concerns itself primarily with means for forming a bayonet loop upon one end of the wire ties and a head upon the other end thereof.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a fragmentary front elevational view of a machine involving this invention.

Figure 2 is a top plan view of a portion of the machine involving this invention.

Figure 3 is a fragmentary plan view of certain operating mechanism.

Figure 4 is a plan view of a completed bale tie formed in the machine.

Figure 5 is an enlarged sectional view taken upon the line V—V of Fig. 2 looking in the direction of the arrows and showing parts in elevation.

Figure 6 is an enlarged sectional view taken upon the line VI—VI of Figure 2 looking in the direction of the arrows.

Figure 7 is a fragmentary top plan view looking upon the line VII—VII of Figure 6 in the direction of the arrows.

Figure 8 is a development of a cam surface.

Figure 9 is an enlarged sectional view taken upon the line IX—IX of Figure 1, looking in the direction of the arrows.

Figure 10 is an enlarged sectional view taken upon the line X—X of Figure 1 looking in the direction of the arrows.

Figure 11 is an end elevational view of the machine.

Figure 12 is a sectional view taken upon the line XII—XII of Fig. 11 looking in the direction of the arrows.

Figure 13 is a fragmentary top plan view of a portion of the machine.

Figure 14 is a sectional view upon the line XIV—XIV of Fig. 13 with parts omitted.

Figure 15 is a view representing the development of a cam.

Figure 16 is a view taken upon the line XVI—XVI of Fig. 17.

Figure 17 is a fragmentary top plan view of certain mechanism for twisting the bayonet loop in the wire.

Figure 18 is an end elevational view looking from the line XVIII—XVIII of Fig. 17 in the direction of the arrows.

Figure 19 is an end elevational view taken upon the line XIX—XIX of Fig. 16 looking in the direction of the arrows with parts in section.

Figure 20 is a sectional view taken upon the line XX—XX of Figure 1 looking in the direction of the arrows with parts omitted.

Figure 21 is a view representing the development of the cam shown in Figure 20.

Figure 22 is a sectional view taken upon the line XXII—XXII of Fig. 1 looking in the direction of the arrows.

Figure 23 is a view representing the development of the cam shown in Fig. 22.

Figure 24 is a sectional view taken upon the line XXIV—XXIV of Fig. 1 looking in the direction of the arrows with parts in elevation.

Figure 25 is a view representing the development of the cam shown in Fig. 24.

Figure 26 is a view taken upon the line XXVI—XXVI of Fig. 1 looking in the direction of the arrows.

Figure 27 is a top plan view of the structure shown in Figure 26.

Figure 28 is a sectional view taken upon the line XXVIII—XXVIII of Figure 27.

Figure 29 is a fragmentary elevational view of the head forming mechanism with parts shown in section.

Figure 30 is an end elevational view of the parts shown in Figure 29 looking at the left hand end.

Figure 31 is a view taken upon the line XXXI—XXXI of Fig. 29 looking in the direction of the arrows showing parts in plan view and a part in section.

Figure 32 is a sectional view taken upon the line XXXII—XXXII of Figure 29.

Figure 33 is an enlarged sectional view taken upon the line XXXIII—XXXIII of Fig. 32.

In the drawings there is illustrated one form of mechanism for carrying out the desired objects of this invention. While the illustrated mechanism constitutes a part of a machine, it may function as an independent machine to which the wires for the bale ties may be furnished.

The wires to be formed into ties are supplied to a pair of parallel sprocket chains 1 (Fig. 2) across which the wires are laid in parallel relation in the recesses 1ᵃ of the sprocket chains (Figs. 8 and 10). These sprocket chains are intermittently driven, one step at a time. They are timed to come to rest with a wire at a predetermined point at which point the head 2 (Fig. 4) is formed on the wire 5. During each pause of the sprocket chains, the end portion of a wire will be positioned upon a stationary gripping member 3 (Figs. 6, 29 and 33). A movable gripping member 4 cooperates with the gripping member 3 to clamp a wire 5 therebetween as shown in Fig. 33. These gripping members have registering grooves to receive the wire and the grooves are enlarged at one end as indicated at 6 in Fig. 33 in which the head 2 is formed.

The movable gripping member 4 has a right angular form with a pendant leg 7 which is pivotally mounted at an intermediate point as indicated at 8. The lower end of the leg 7 has a roller 9 fitting in a cam groove 10 formed in a cam 11 secured upon a shaft 12. When a wire approaches the stationary gripping member 3, the movable member 4 is disengaged therefrom due to the action of the cam 11 with the result that the wire will come to rest in the groove upon the stationary gripping member. As soon as it comes to rest, the movable gripping member 4 will be swung thereon by the cam 11 for firmly gripping and holding the wire while the head 2 is formed thereon. In order to properly position the wires upon the gripping member 3 so that the proper length will project from such gripping members for heading purposes, a pair of guides 13 (Fig. 2) are secured upon the machine between which the wires are designed to pass.

The head 2 on the end of the wire is adapted to be formed or swaged by a punch 14 (Figs. 6 and 29) slidably mounted in a bearing 15 formed in a bracket 16 attached to the framework. The slidable punch is provided with a head 15$^a$ and a coil spring 17 is located between the head 15$^a$ and the bearing. This spring serves to retract the punch immediately after each impact.

The punch is designed to be actuated by a plunger 18 slidably mounted in bearings 19 and 20 (Fig. 6) formed upon suitable brackets attached to the machine. A collar 21 is secured upon the reciprocating plunger 18, and a link 22 connects the collar with a cam actuated lever 23, which is pivoted at its lower end to a bracket 24 as indicated at 25. The lever 23 carries an intermediate roller 26 in contact with a scroll cam 27 upon the end of the shaft 12. A strong coil spring 28 connects the upper portion of the lever 23 with the framework of the machine. The grippers 3 and 4, cam 11, shaft 12, punch 14, and their supporting structure may be shifted to the right or left to accommodate different lengths of rods.

It will be noted that the cam 11 has a groove with an offset portion shown in dotted lines in Fig. 6. When the roller 9 travels in the main portion of the cam groove, the movable gripper will be in elevated position and the roller 26 will be riding upon the high part of the cam 27 thereby shifting the plunger 18 to the left, and putting the spring 28 under strong tension. As soon as the roller 9 reaches the offset portion of the groove, a wire will be taking its position upon the stationary gripping member, the movable gripper will immediately clamp the wire as the roller 9 moves into the offset portion of the cam groove. During this rotation of the shaft 12, the cam 27 will have rotated to release lever 23 to the action of spring 28 for reciprocating the plunger 18 for actuating the punch 14 for forming the head 2 upon the end of the wire in the recess 6. Of course, it will be appreciated that the movable gripping head and plunger 18 operate substantially simultaneously. As soon as an impact has occurred, the spring 17 will slightly retract the punch and plunger so that the parts assume the positions shown in Fig. 6 which are directly after an impact.

As the shaft 12 continues its rotation, the movable gripper head will be elevated and the sprocket chains will again rotate and remove the headed rod and bring another wire into position to be headed whereby a continuous process results.

The sprocket chains carry the headed wire around the inner sprocket wheel 29 (Figs. 5 and 10) where it will fall by gravity upon a pair of guide members 30 (Fig. 2). These guide members are attached to the shaft 31 that supports the inner sprocket 29 and rest upon a shaft 32 that carries a pair of slotted wheels or disks 33. As a headed rod slides down the guides 30, it will drop into registering slots in the disks 33 and be rotated in an anti-clockwise direction as viewed in Fig. 10 or in a clockwise direction as viewed in Fig. 8. The disks 33 are intermittently rotated with the sprocket chains and during each pause thereof a bayonet slot or eye is formed in the opposite end of a wire while a head is formed upon the next rear wire upon the sprockets.

When the slotted disks come to rest, the left hand portion of the wire will come to rest over an anvil 34 (Figs. 1, 17, 26 and 28) which is in the form of a head upon an adjustable bolt 35, threaded in a bearing 36 in which the left hand end of the shaft 32 is journaled. A bracket 37 (Fig. 1) attached to the framework extends over the anvil and has an upstanding lug 38. A hammer or gripper 39 best shown in Fig. 28 is pivoted to said bracket and lies in a slot in the bracket as shown in Fig. 28. It will be noted that this hammer has an arm 39$^a$ pivoted to said bracket, an upstanding portion or lug 39$^b$, a downwardly projecting hammer head 39$^c$ and a laterally extending cam arm 39$^d$ that slopes upwardly toward its outer end. A slide 40 which is mounted upon the bracket 37 has an inwardly extending arm 41 that carries a roller 42 adapted to travel over the cam arm for depressing the hammer. The slide is preferably mounted by a screw 40$^a$. A coil spring 43 positioned between the lug 39$^b$ and the slide 40 normally tends to tilt the hammer in an upward direction. The slide 40 is connected by a rod 44 to a cam lever 45 which is periodically actuated by a cam 46. The lever 45 is pivoted intermediate its end to an angular frame member 47 as best shown in Fig. 20.

A hollow shaft 48 (Figs. 1 and 16 to 19) is mounted by means of brackets 49 and 50 upon the angle members 47, and extends under the bracket 37. A slidable collar 51 is mounted upon the shaft 48 and forward of this collar the lower portion of the shaft is cut away as shown in Figs. 16 and 18. The upper portion of this shaft 48 is provided with a longitudinally extending groove between the lines 52 in Figs. 17 and 18. An upwardly and downwardly movable stripper member 53 is mounted in said groove and carries a pin 54 in the shape of a bayonet slot at its forward end which extends through an aperture 55 in the upper portion of the shaft 48. This upper portion of the shaft 48 preferably consists of member 48$^a$. The rear end of the stripper member 53 has an upwardly directed tail 56 and a coil spring 57 is positioned between said tail 56 and the shaft 48 which is suitably inclined at the end of the groove and formed with a socket 58 to seat said spring. The rear end of the stripper bar has a right angled leg 53$^a$ that extends through a slot in the shaft 48 and which is pivoted thereto by a pivot pin 53$^b$. It will be obvious that the collar 51 may be moved rearwardly for depressing the tail 56 and elevating the stripper member. For shifting the collar backwardly and forwardly, the same is provided with a yoke lever 59 best shown in Fig. 22. This yoke lever is pivoted intermediate its ends to the frame member 47 and carries a roller 60 at its lower end that travels in a cam groove 61 formed in a cam 62. The cam groove 61 has an offset portion 61ᵃ shown in the development thereof in Fig. 23 for lifting the stripper bar.

In referring to Figs. 1, 16 and 24, it will be observed that a vertical bearing 63 is mounted upon the upper flange of the angular member 47, a vertical shaft 64 is journaled in said bearing and extends through said flange. This shaft carries a bevel gear 65 at its lower end and a crank arm 66 at its upper end. A pin 67 is mounted upon the end of the crank arm. Rotation of the crank arm in the proper direction is adapted to fold the end portion of the wire around the pin 54 to form a loop as will later more fully appear. The gear 65 is adapted to be rotated by a gear segment 68 (Fig. 24) which is pivoted intermediate its ends to the frame member 47. The lower end of this gear segment carries a roller or stud 69 which travels in a cam groove 70 formed in a cam 71. It will be noted in Fig. 25 that this cam groove has an offset portion 70ᵃ that merges into a further offset portion 70ᵇ for a purpose that will later appear.

Within the shaft 48, there is a slidable rod 72 that also extends through the leg 53ᵃ of the stripper bar. The hole in the stripper is oppositely bevelled in a vertical plane passing through the center of the pivot pin 53ᵇ as indicated at 73, 74 and 75 so that the stripper bar can rock relative to said rod 72. The forward end of the rod 72 carries a bayonet loop forming die 76 best shown in dotted lines in Fig. 17. It will be noted that this die has a slot extending inwardly from its forward end. The rear portion of the slot is somewhat restricted while the forward portion has a curved enlargement 77. The design of the die slot is such that it will fit over the pin or lug 54 when it is moved forwardly.

The manner of sliding the rod 72 forwardly will now be set forth. In referring to Figs. 1, 2, 12 and 13 it will be noted that the rear end of the rod 72 is provided with a collar 78 having a groove 79 for attaching a yoke or shipper lever 80. The operating end of this yoke lever 80 extends into a gear box 81 and is attached to a small gear 82 journaled therein on a shaft 83. The gear 82 is adapted to be driven by another gear 84 in the gear box which is journaled upon a shaft 85. A lever 86 is attached to the gear 84 and this lever is attached to a link 87 which in turn is connected to the upper end of a cam operated lever 88 best shown in Fig. 1. The lever 88 is pivoted intermediate its ends to the frame member 47 and its lower end is provided with means for engaging a cam groove 89 formed in the aforementioned cam 46. It will be obvious that when the lever 88 is actuated toward the left, the gear 84 will be rotated in a clockwise direction (Fig. 12) causing gear 82 to rotate in a counterclockwise direction for swinging lever 80 forwardly and shifting the rod 72 forwardly to bring the die 76 into engagement with the pin 54.

It seems desirable at this point to briefly describe the operation of the loop forming mechanism. When the wire carrying disks 33 carry a headed wire to the loop forming position, the stripper bar 53 is elevated so that the wire can pass thereunder and take the position shown in Fig. 17 in which position the stripper bar 53 has descended as shown in Fig. 17. In this position, the hammer 39 will be partially forced downwardly as the cam portion 46ᵃ (Fig. 21) engages the lever 45, and the cam 71 will rotate the gear segment 68 for rotating the crank 66 in a clockwise direction (Fig. 17) and causing the pin 67 to engage the wire 5 to fold the same over the pin 54 to form a loop and to bring the end portion of the wire upon the anvil 34 alongside the main portion of the wire. When this operation has been completed, the cam portion 46ᵇ will engage the cam lever 45 and cause the hammer 39 to fully descend and clamp the two portions of the wire upon the anvil 34. As the crank 69 is moving forward, the yoke lever 80 will be actuated for forcing the collar 78 against the spring 90 positioned between the yoke collar 78 and a collar 91 fast upon the rod 72 for shifting the rod 72 to force the die 76 over the folded wire upon the pin 54 to form the bayonet loop. As soon as these operations are completed, the cam portion 70ᵃ of cam 71 will engage the gear segment 68 and slightly retract the crank 66 whereupon shaft 48 will be rotated for twisting the loop thereon as shown in Fig. 4.

In order to rotate shaft 48 which may be termed the wire twisting shaft or member, the same is provided with a small gear 92 (Fig. 1) at its end which is driven by a large gear 93. As soon as the wire is twisted the stripper bar 53 will be elevated to disengage or strip the pin 54 from the formed bayonet loop to allow the disks 33 to revolve another step for looping another wire.

The means for operating the different parts of the machine will now be set forth. Power is applied to a pulley 94 (Fig. 2) for operating shaft 95 upon which a bevelled pinion 96 is secured for driving a bevelled pinion 97 upon the end of the aforementioned shaft 12. The gear 93 is loosely mounted upon the cam shaft 98. A ratchet wheel 99 (Fig. 14) is secured to said gear wheel and this ratchet wheel has three teeth 100 adapted to be engaged by a pawl 101 pivoted upon a shaft 102 mounted in an oscillatable casing 103 concentric with the shaft 98. A link 104 attached to the casing 103 is pivoted to a lever 105. The lever 105 is pivoted at its lower end to the framework as indicated at 106. The lever 105 has an arcuate slot 107 through which the shaft 12 passes, and adjacent one end of the slot 107 there is a roller 108. A cam 109 (Fig. 11) upon shaft 12 is adapted for engaging roller 108 for actuating the lever 105 during each rotation of said shaft 12. A spring 110 connects the lever 105 with the framework for retracting the lever 105 after each actuation. Each actuation of the lever 105 will rotate gear 93 one-third of a revolution, and pinion 92 and twisting shaft 48 will be given eight revolutions for twisting the wire loop.

The shaft 12 is geared to an intermediate idle shaft 111 as shown in Fig. 3 by means of gears 112 and 113. The idle shaft 111 drives the cam shaft 98 by means of the gear 113 and a gear 114 upon the cam shaft.

The sprocket conveying chains 1 and the wire carrying disks 33 are intermittently driven from the cam shaft 98 as shown in Figs. 7 and 10. To this end, a ratchet wheel 115 is secured upon the disk carrying shaft 32. A lever 116 pivoted coaxially with said shaft carries a pawl 117 for engaging said ratchet wheel. A link 118 connects the lever 116 with the upper end of a cam actuated lever 119 pivoted at its lower end to the framework as indicated at 120. The lever 119 is provided with a roller 121 intermediate its ends which is adapted to be actuated by a cam 122 on the shaft 98. A coil spring 119a connects the lever 119 with the framework and is effective for retracting said lever after each actuation. Thus it will be apparent that during each rotation of the cam shaft 98, the disk shaft 32 will be rotated one step, or a fraction of a revolution.

The shaft 32 is connected by sprocket gearing 124 to the shaft 31 carrying the head sprocket 29 as shown in Figs. 2 and 5. The sprocket chains travel around tail sprockets 125 secured upon a shaft 126. Thus it will be seen that the wire carrying sprockets are intermittently rotated at the same time that the wire carrying disks 33 are rotated so that when the machine advances a headed wire to be looped, it also advances another wire to be headed so that while one wire is being formed with a bayonet loop another wire is being headed.

In making these bale ties with a bayonet slot at one end and a head upon the other end, it is possible to wrap the tie around the bale and insert the head into the enlarged portion of the loop and allow it to slip into the restricted portion of the loop as the bale expands.

The operation of the machine should be understood from the foregoing description in as much as the heading operation and the bayonet slot forming operation have already been fully set forth. A brief summary of the operation will therefore only be given. The shaft 95 drives the shaft 12 which in turn drives the cam shaft 98 through the intermediate shaft 111. Consequently, the cam shaft 98 rotates continuously and controls all the operations to be preformed in timed relation. In the drawings, the parts are in position for heading one rod and forming a bayonet slot in another wire and these two operations are carried on simultaneously after the first wire has been headed.

As previously related, the wire to be headed is clamped between gripper or die blocks 3 and 4 while the punch 14 is actuated for forming a head upon one end. While this operation is going on, the forward wire is formed with a bayonet loop upon its opposite end by the folding crank 66, pin 54 and die 76. These parts are actuated through connections with the cam shaft 98 which makes one revolution for each operation of looping a wire.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a machine of the class described, mechanism for advancing a pair of wires in parallel relation to predetermined points, and mechanism for forming a head upon one wire while a bayonet loop is being formed upon the other wire.

2. In a machine for forming bale ties, intermittently rotating means for advancing a pair of wires, means for clamping the opposite ends of said wires, mechanism for forming a head upon the clamped end of one wire and forming a bayonet loop upon the clamped end of the other wire.

3. In a machine of the class described, an anvil support, means for carrying a wire upon said support, a movable member having a pin located in spaced relation from said support, means for folding a portion of said wire over said pin and depositing an end portion upon said support, a slidable die for engaging over the wire folded around said pin, means for clamping the wire upon said support and means for rotating said movable member for twisting said wire and means for moving said movable member for releasing said wire.

4. In a machine of the class described, a rotatable member for carrying a wire, means for arresting said member in a predetermined position, means for clamping a portion of said wire in said predetermined position, means for supporting a pin with a rounded portion adjacent said wire, a swingable member for folding said wire around said pin, a die for shaping the wire around said pin and means for twisting said wire.

5. In a machine of the class described, a pair of spaced supports, intermittently rotatable means for advancing a wire upon each support, means for clamping a wire to one support and forming a head upon one end thereof, means for forming an end portion of the other wire into a bayonet loop and placing the end portion upon the other support, means for clamping the wire to said second support and means for twisting said wire.

6. In a machine of the class described, a support, means for depositing a wire upon said support, a bayonet slot pin, means for folding an end portion of the wire around said pin and placing the end portion upon said support, a rotatable member carrying said pin, a rod slidable in said rotatable member and carrying a die for shaping the wire over said pin, means for clamping the two portions of wire upon said support and means for rotating said member for twisting said wire.

7. In a machine of the class described, a rotatable shaft, a stripper bar pivoted to said shaft, means for tilting said bar with respect to said shaft, a pin carried by said bar, a support below said pin, means for transferring a wire upon said support, a rotatable member for folding the wire around said pin and placing the end portion upon said support, a rod slidable in said shaft and carrying a die for shaping the wire around said pin, means for clamping the wire upon said support, and means for rotating said shaft for twisting the wire.

8. In a machine of the class described, a pair of rotatable sprocket chains fashioned for conveying wire rods, a pair of slotted disks for receiving the wire from said sprocket chains, means for intermittently rotating said members and means for simultaneously forming a head upon a wire rod carried by said chains and forming a bayonet loop on a wire rod carried by said disks.

9. In a machine of the class described, a stationary support, means for transferring a wire and placing a portion upon said support, a pin, means for moving the pin adjacent the wire, a rotatable crank having a lug for engaging said wire and folding the same around said pin, and placing the end of the folded portion upon said support, means for clamping the two portions of the wire upon said support, a die for shaping the wire over said pin and means for rotating said die and pin for twisting the wire.

10. In a machine of the class described, a pair of die members for clamping a wire therebetween, a punch for swaging the end of said wire, a plunger for actuating said punch, and a spring put under tension for actuating said plunger.

11. In a machine of the class described, rotatable means for carrying a pair of wires in parallel relation, mechanism for intermittently rotating said means to bring the wires to rest at predetermined points, mechanism for clamping one wire and swaging a head upon one end thereof while the same is at rest and mechanism for simultaneously forming a loop upon an end of the other wire.

12. In a machine of the class described, a rotatable member, a stripper bar having a wire loop forming pin pivoted to said member, means for actuating said stripper bar, means for folding a wire around said pin, a slidably mounted die carried by said member for shaping the wire around said pin, means for clamping the wire and means for rotating said member for twisting the folded wire.

13. In an apparatus of the class described, a pair of wire conveyors, a pair of slotted disks, means for guiding the wires from said conveyors to said slotted disks, means for intermittently rotating said conveyors and disks, and means for forming a head upon a wire on said conveyors, and forming a loop upon a wire carried by said disks.

14. In a machine of the class described, movable members for supporting a pair of wires in parallel relation, a pair of supports, means for intermittently advancing said members for moving a wire from one support to the other, means for clamping the wires upon said supports, mechanism for forming a head upon the wire upon one support and means for forming a loop upon the wire upon the other support.

15. In a machine of the class described, the combination with means for advancing a plurality of wires in parallel relation, of a pair of spaced supports upon which adjacent wires are deposited, means for clamping said wires upon said supports, head forming mechanism for forming a head upon the wire upon one support, and loop forming mechanism for forming a bayonet loop upon the wire upon the other support.

16. In a machine of the class described, the combination with means for intermittently advancing a wire, of a head forming support for receiving the wire, means for clamping said wire upon said support, means for forming a head upon an end of said wire while the same is clamped upon said support, a second support for receiving the headed wire, means for clamping the wire upon said second support and mechanism for forming a bayonet loop upon said wire.

17. In a machine of the class described, mechanism for simultaneously clamping a pair of wire rods in parallel spaced relation, means including a punch for forming a head upon the end of one rod, and means for forming a bayonet loop upon the opposite end of the other wire including a rotatable member for twisting the loop.

18. In a machine of the class described, the combination with means for intermittently advancing a wire, of a head forming support for receiving the wire, means for clamping said wire upon said support, means for forming a head upon one end of the wire adjacent said support, said support clamping means and head forming means being adjustable with respect to said advancing means, a second support for receiving the headed wire, means for clamping the wire upon said second support and means for forming a bayonet slot upon the other end of the said wire.

19. In a machine of the class described, means for intermittently advancing a wire, a pair of supports one upon each side of said advancing means, said supports being spaced longitudinally of said advancing means, one of said supports being adjustable toward and from said advancing means, means for clamping the wire upon one support, means for forming a head upon the end of the wire adjacent said support, said wire being advanced after the heading operation to the second support, means for clamping the wire upon said second support, and mechanism for forming a bayonet loop upon the end of the wire adjacent said second support.

20. In a machine of the class described, a pair of die members for clamping a wire rod therebetween, a longitudinally yieldable punch for swaging the end of said wire rod, a reciprocable plunger for actuating said punch, means for withdrawing said plunger and yielding means put under tension by the withdrawal of said plunger for positively actuating said plunger for imparting an impact to said punch.

ALBERT F. BRADLEY.